United States Patent

Nicol et al.

[11] Patent Number: 6,003,924
[45] Date of Patent: Dec. 21, 1999

[54] MODULAR DRAWER SYSTEM

[76] Inventors: Robert E. Nicol, 19675 S. Beavercreek Rd., Oregon City, Oreg. 97045; Ernest W. Laitinen, 2461 E. Territorial Rd., Canby, Oreg. 91013

[21] Appl. No.: 09/085,184

[22] Filed: May 26, 1998

Related U.S. Application Data

[63] Continuation of application No. 08/745,599, Nov. 8, 1996, abandoned.

[51] Int. Cl.$^6$ .................. B60P 7/06; B60P 7/16
[52] U.S. Cl. .................. 296/37.6; 312/111
[58] Field of Search .................. 312/111, 9.48; 396/37.2, 37.6

[56] References Cited

U.S. PATENT DOCUMENTS

| | | |
|---|---|---|
| 129,688 | 7/1872 | Smith . |
| 1,751,899 | 3/1930 | Whitfield .................. 312/334.36 X |
| 2,121,190 | 6/1938 | Fellowes .................. 312/111 X |
| 2,169,769 | 8/1939 | Regenhardt .................. 312/111 |
| 2,410,700 | 11/1946 | Zalkind .................. 312/111 |
| 2,569,236 | 9/1951 | Hake .................. 312/111 |
| 3,552,817 | 1/1971 | Marcolongo .................. 312/111 X |
| 3,567,298 | 3/1971 | Ambaum et al. .................. 312/111 |
| 3,664,704 | 5/1972 | Ellis .................. 224/404 X |
| 3,743,372 | 7/1973 | Ruggerone .................. 312/111 X |
| 4,573,731 | 3/1986 | Knaack et al. .................. 296/37.6 X |
| 4,848,626 | 7/1989 | Waters .................. 296/37.6 X |
| 5,065,922 | 11/1991 | Harris .................. 296/37.6 X |
| 5,102,180 | 4/1992 | Finley .................. 296/37.6 |
| 5,131,709 | 7/1992 | Spica .................. 296/37.2 |
| 5,137,340 | 8/1992 | Cugley et al. .................. 312/111 X |
| 5,334,904 | 8/1994 | Kramer .................. 312/111 X |
| 5,657,916 | 8/1997 | Tackett .................. 296/37.6 X |

FOREIGN PATENT DOCUMENTS

| | | |
|---|---|---|
| 547130 | 5/1956 | Belgium . |
| 856608 | 11/1970 | Canada .................. 312/9.48 |

OTHER PUBLICATIONS

"Weather Guard Pack Rat Drawers Units," (1994) pp. 38–39.
"Armadillo Truck Vault" (1995) pp. 1–4.

*Primary Examiner*—Peter M. Cuomo
*Assistant Examiner*—David E. Allred
*Attorney, Agent, or Firm*—Chernoff, Vilhauer, McClung & Stenzel

[57] ABSTRACT

A modular drawer system is particularly adapted for installation on vehicular load-carrying surfaces such as the beds of pickup trucks and the cargo-supporting floors of utility vehicles to transport and store tools, machinery parts, building materials and the like in an orderly, easily-accessible manner. The system's modularity provides highly variable alternative stacked configurations and volumes to accommodate different vehicles. Although lightweight and easily installable, the system nevertheless is highly resistant to displacement under the dynamic forces typically experienced in vehicular applications, and is also highly resistant to vertical loading.

5 Claims, 2 Drawing Sheets

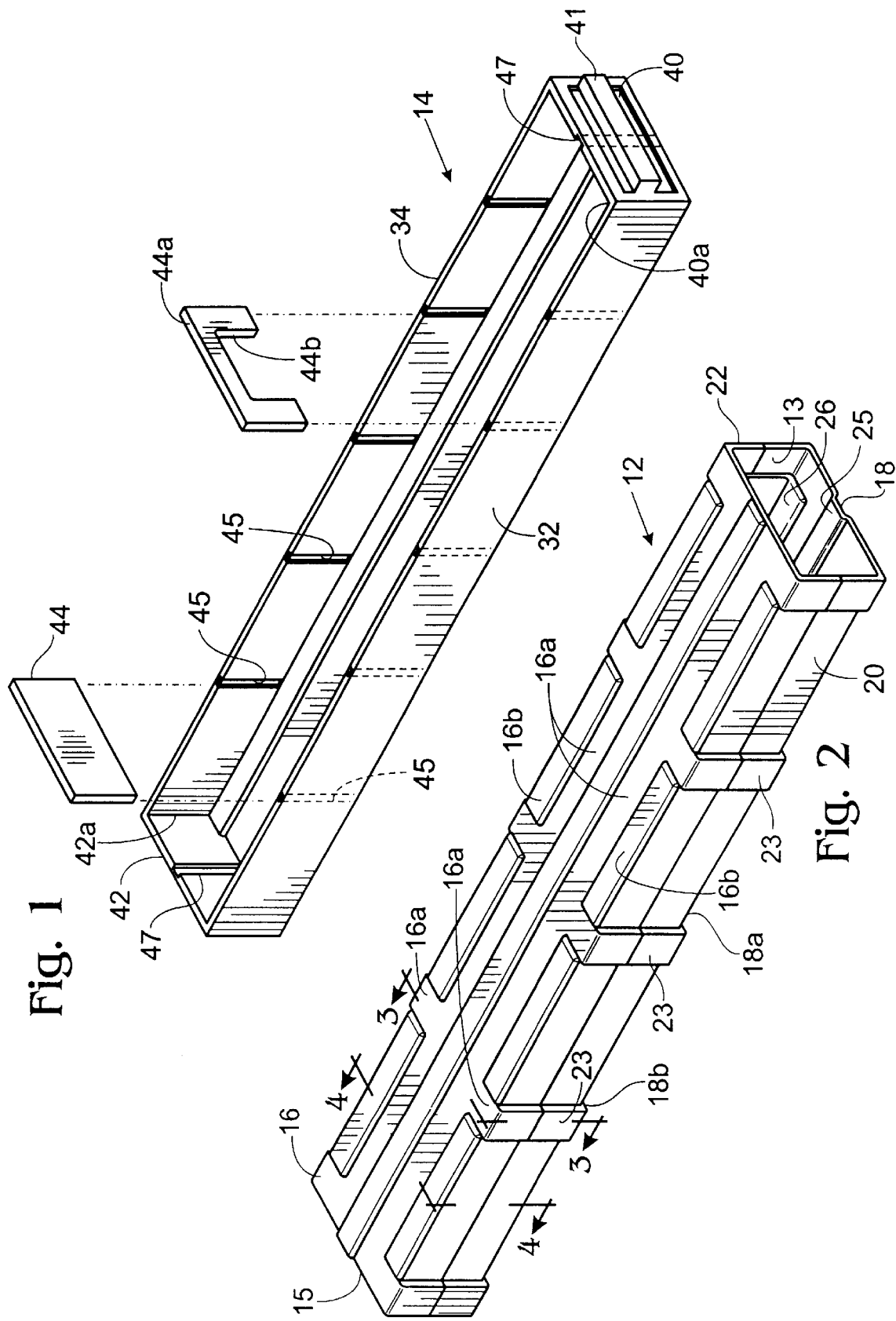

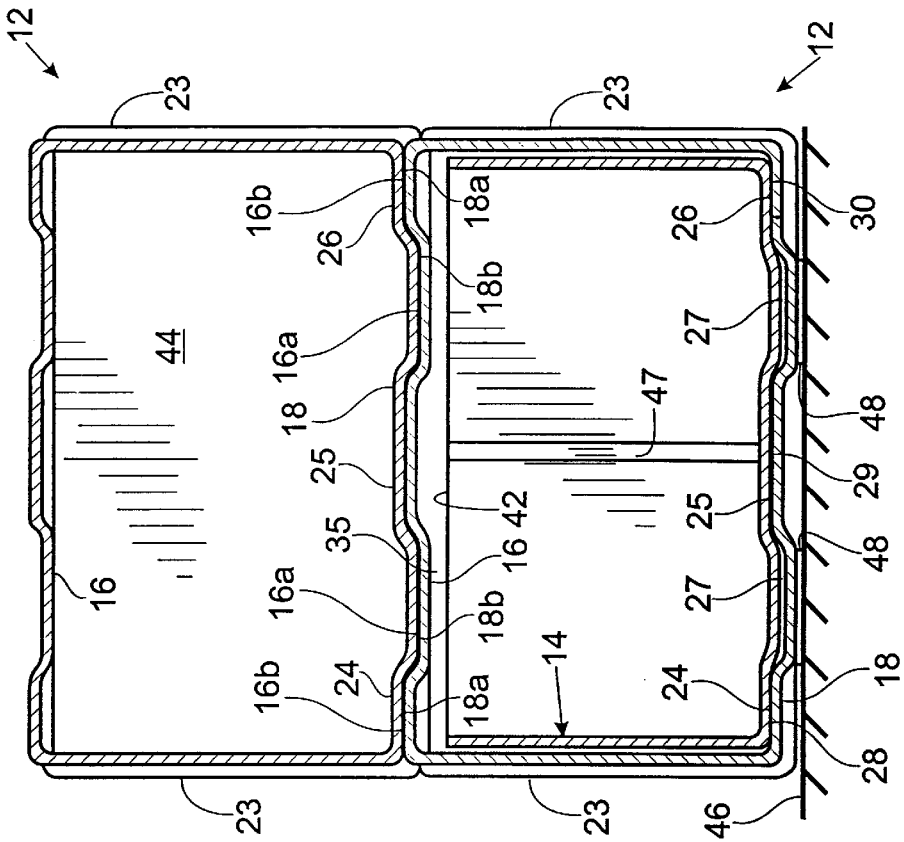
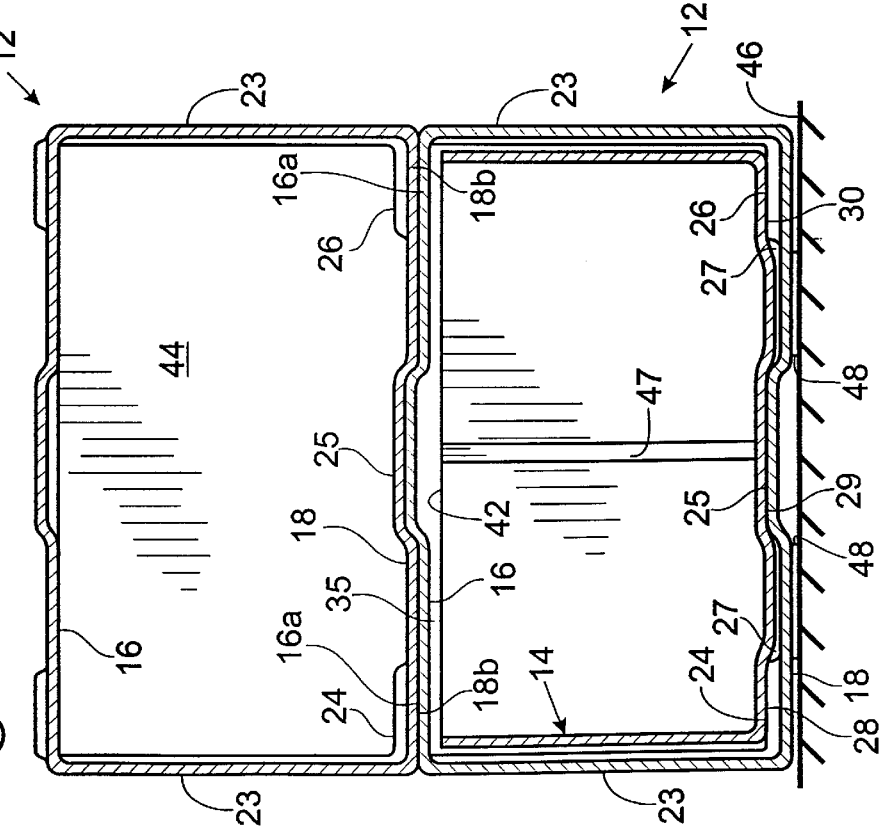

MODULAR DRAWER SYSTEM

This in a continuation of application Ser. No. 08/745,599, filed Nov. 8, 1996, now abandoned.

BACKGROUND OF THE INVENTION

The present invention relates to a drawer system for storing and transporting tools, machinery parts, building materials and the like on vehicular load-carrying surfaces, such as the beds of pickup trucks or the cargo-carrying floors of utility vehicles. More particularly, the invention relates to an easily-installable accessory-type drawer system of modular, stackable construction adaptable to a wide variety of configurations and volumetric space requirements depending upon the particular vehicle in which the system is to be installed.

Modular stackable drawer systems for various applications are well known, such as those shown in Smith U.S. Pat. No. 129,688 and Belgian published patent application No. 547,130. However drawer systems suitable for use in vehicles must normally be custom built to fit each particular vehicle's configuration and space requirements in order to secure the drawer system against the dynamic forces of braking, acceleration, turning and vertical oscillation commonly encountered in vehicles. Existing modular stackable drawer systems are not well adapted to maintain stable positions and resist movement under such dynamic conditions.

Existing modular drawer systems are also not well adapted to provide stable, yet lightweight, resistance to vertical loading in vehicles. This is likewise due to the lack of resistance of existing drawer systems to dynamic conditions, as well as deformation of the walls of such systems when subjected to vertical loads, which impedes the slidability of the drawers.

BRIEF SUMMARY OF THE INVENTION

The present invention overcomes the foregoing deficiencies of present drawer systems with respect to dynamic vehicular conditions.

According to one aspect of the invention, a modular, stackable drawer system particularly adapted for installation on vehicular load-carrying surfaces has a plurality of elongate rectilinear housings and a plurality of elongate drawers each matingly slidable longitudinally within a respective one of the elongate housings. At least the top of a first housing and the bottom of a second housing have mutually-mating respective exterior surfaces enabling longitudinally-aligned detachable engagement therebetween in a manner resistive to sliding movement between the first and second housings both longitudinally and transversely when the second housing is stacked atop the first housing. The bottom of at least the first housing has at least one vehicle-engaging fastener enabling detachable fastening of the housing to a load-carrying surface of a vehicle so as to prevent sliding movement between the first housing and the load-carrying surface, likewise both longitudinally and transversely.

Preferably the vehicle-engaging fastener is attachable to the load-carrying surface of the vehicle in a manner preventing vertical oscillation between the first housing and the load-carrying surface as well.

The foregoing features of the present invention provide an accessory-type, dynamically stable vehicular modular drawer system which is highly variable in configuration and volumetric space requirements so as to adapt to almost all vehicle configurations by arranging the drawer module assemblies in any side-by-side and/or stacked configuration.

Moreover, in accordance with another aspect of the invention, the modular drawer assemblies are designed to provide significant vertical resistance to overhead loading from other like drawer assemblies, or from other loads, without deforming sufficiently to interfere with the slidability of the drawers located beneath the loads.

In accordance with another aspect of the invention, the mating respective slide surfaces of each drawer and its housing form respective single homogeneous pieces with the drawer and housing.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 1 is a perspective exploded view of an exemplary embodiment of the drawer component of a modular drawer assembly in accordance with the present invention.

FIG. 2 is a perspective view of a housing into which the drawer of FIG. 1 is insertable.

FIG. 3 is a sectional view of a pair of housings of the type shown in FIG. 2, one atop the other, the section being taken along line 3—3 of FIG. 2 and the bottom housing having the drawer of FIG. 1 inserted therein.

FIG. 4 is a sectional view similar to that of FIG. 3, except that the section is taken along line 4—4 of FIG. 2.

DETAILED DESCRIPTION OF THE INVENTION

An exemplary modular drawer assembly includes an elongate housing 12 and an elongate drawer 14 matingly insertable longitudinally into the housing 12 through its open end 13. The housing 12 has a generally rectilinear tubular cross section having a top wall 16, bottom wall 18 and sidewalls 20, 22 all extending longitudinally between the opposite ends of the housing 12. The end 15a of the housing is closed by an end panel (not shown). The top and bottom walls 16 and 18 are preferably wider than the height of the sidewalls 20 and 22 so that the drawer assembly has a low center of gravity relative to its width for high resistance to side tipping. The significantly elongated form of the drawer assembly shown in FIGS. 1 and 2 is especially suitable for side-by-side and stacked placement upon the bed of a pickup truck or van. A shorter form of the drawer assembly (not shown) is suitable for sports/utility vehicles having shorter beds.

The housing 12 and drawer 14 are preferably constructed of high-density polyethylene having thicknesses of approximately 3/16 inch for the housing and 1/8 inch for the drawer, respectively. Preferably, a conventional rotational molding process is used to form the housing, and a conventional vacuum molding process is used to form the drawer. The housing and drawer could alternatively be constructed from other suitable waterproof and rust-resistant materials, such as ABS, PVC, or aluminum.

Located proximate to each respective sidewall 20, 22 of the housing 12 are respective upwardly-facing, transversely-spaced interior slide surfaces 24 and 26, each forming a single homogeneous piece with the housing 12 as shown in FIGS. 3 and 4. Such slide surfaces need not contact the sidewalls directly, as shown, but could alternatively be spaced inward from the sidewalls supported entirely by the bottom wall 18 of the housing, in the same manner as the optional central slide surface 25. These slide surfaces 24, 25 and 26 slidably engage downwardly-facing, transversely-spaced exterior slide surfaces 28, 29 and 30 on the bottom of the drawer 14, each likewise forming a single homogeneous piece with the drawer. Spaces such as 27 are preferably provided between nonslide surfaces on the bottoms of the drawer and housing, to facilitate slidability of the drawer.

As shown in FIGS. 3 and 4, the sliding engagement of the slide surfaces supports the drawer 14 in vertically-spaced relation to the top wall 16 of the housing to resist the application of force by the top wall against the drawer under loading applied perpendicular to the top wall by like drawer assemblies or other overhead loads. Resistance to such force is also provided by exterior elongate protruding ribs 23 on the sidewalls 20, 22 extending perpendicular to the top wall 16, which resist bending of the sidewalls under such loading. Both of these features cooperate to maintain slidability of the drawer by minimizing frictional resistance to sliding despite overhead loading of the drawer assembly.

The drawer 14 has a face panel 40, with a handle 41, and an end panel 42, likewise spaced from the housing top wall 16. The entire drawer fits slidably within the confines of the housing 12 so that the housing forms a rain-proof enclosure around the drawer.

One or more detachable transverse partition panels 44 or 44a are optionally provided for sliding insertion into selected ones of grooves 45 formed on the interior surface of the drawer sidewalls 32 and 34. Partition panel 44a has an aperture 44b extending therethrough for accommodating particularly long items to be placed in the drawer. Longitudinal rectangular partition panels (not shown) may also be provided for alternative insertion between end grooves 47, or diagonally between two opposite corners such as 40a and 42a. Shallow grooves (not shown) in the bottom of the drawer can also be provided if desired to capture the bottoms of the various partition panels. The top of each partition panel is likewise spaced from the top wall 16 of the housing when fully inserted.

The spaces 35 between all of the foregoing components of each drawer 14 and the top wall 16 of each housing 12 are small enough that such spaces will close before any nonelastic deformation of the housing 12 due to overhead loads can occur, thereby resisting such excessive deformations. Such excessive deformations might otherwise occur, for example, as a result of dynamic vertical oscillations from uneven road surfaces which change the static overhead loads temporarily into dynamic loads which might permanently deform or rupture a housing 12.

The top and bottom of each housing 12 have mutually-mating respective exterior surfaces enabling longitudinally-aligned detachable stacking engagement therebetween so as to prevent sliding movement between the housings both longitudinally and transversely when dynamic forces from braking, acceleration and turning are experienced. Although such mutually-mating exterior surfaces may, within the scope of the present invention, be provided by such means as tape having double-sided adhesive, or mating hook and loop material, such surfaces are preferably composed of mating interlocking contours on the top and bottom surfaces of each housing 12. For example, depressions 16a and protrusions 16b on the top 16 of each housing interlock receptively with mating protrusions 18b and depressions 18a, respectively, on the bottom 18 of each housing to prevent both longitudinal and transverse sliding movement between the housings when they are stacked one atop the other as in FIGS. 3 and 4.

The bottom 18 of each housing 12 in contact with a vehicular load-carrying surface 46, such as a pickup truck bed or utility vehicle cargo floor, has vehicle-engaging fasteners 48 enabling detachable fastening of the housing to the vehicle load-carrying surface to likewise prevent such longitudinal and transverse sliding movement. Preferably, the fasteners comprise tape having double-sided adhesive, or mating hook and loop material. Such fasteners resist not only longitudinal and transverse dynamic forces, but also oscillatory vertical dynamic forces typical of vehicles which might tend to bounce the drawer assemblies upward from the load-carrying surface.

If desired, such fasteners can also be inserted between stacked housings to resist oscillatory vertical dynamic forces. Alternatively, straps can be wrapped around a group of stacked housings to resist such forces.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A combination of a vehicle and a lightweight modular drawer system for holding heavy loads in said vehicle, said combination comprising:

(a) a modular drawer system including an elongate housing having a top and a bottom and a generally rectilinear cross section with at least a longitudinally-extending top wall and longitudinally-extending sidewalls substantially perpendicular to said top wall, said walls being of a generally uniform thickness throughout;

(b) said top and bottom of said housing having respective mutually-mating top and bottom exterior surfaces comprising respective protrusions on said top exterior surface matingly corresponding to respective depressions on said bottom exterior surface;

(c) an elongate drawer matingly slidable longitudinally within said elongate housing;

(d) said bottom of said housing having upwardly-facing interior slides transversely spaced from each other, said interior slides being interconnected transversely by a portion of said bottom of said housing so as to form a single homogeneous piece with said portion, said slides protruding upwardly from said portion;

(e) wherein said bottom depressions and said interior slides on said bottom of said housing are simultaneously formed on directly opposite surfaces of said bottom, thus maintaining said generally uniform thickness;

(f) said drawer having upstanding walls and a bottom including downwardly-facing exterior slides formed by exterior depressions on said bottom of said drawer which are transversely spaced from each other and slidably engaged with said interior slides of said housing, said exterior slides forming a single homogeneous piece with said bottom of said drawer such that said bottom is of generally uniform thickness;

(g) said interior slides supporting said drawer sufficiently loosely within said housing to prevent said housing from applying force against said upstanding walls of said drawer under loading applied perpendicular to said top wall of said housing sufficient to cause substantially elastic deformation of said housing, but nevertheless enabling said housing to apply force against said upstanding walls of said drawer under loading applied perpendicular to said top wall of said housing in order to prevent nonelastic deformation of said housing;

(g) said elongate housing being attached to said vehicle.

2. The combination of claim 1 wherein said housing is attached to said vehicle by means of a fastener on said bottom of said housing.

3. The combination of claim 2 wherein said fastener includes respective matingly attachable and detachable materials, one of which is adhesively attached to said bottom of said housing and the other of which is adhesively attached to said vehicle.

4. The combination of claim 1 wherein said drawer includes a face panel slidable within said housing.

5. The combination of claim 1 wherein said drawer includes at least one upstanding partition panel.

* * * * *